US009371411B2

(12) United States Patent
Arpac et al.

(10) Patent No.: US 9,371,411 B2
(45) Date of Patent: Jun. 21, 2016

(54) ABRASION-RESISTANT AND ALKALI-RESISTANT COATINGS OR MOULDED BODIES HAVING A LOW-ENERGY SURFACE

(75) Inventors: Ertugrul Arpac, Antalya (TR); Helmut Schmidt, Saarbruecken-Guedingen (DE); Murat Akarsu, Saarbruecken (DE)

(73) Assignee: LEIBNIZ-INSTITUT FUER NEUE MATERIALIEN GEMEINNUETZIGE GMBH, Saarbruecken (DE)

( * ) Notice: Subject to any disclaimer, the term of this patent is extended or adjusted under 35 U.S.C. 154(b) by 934 days.

(21) Appl. No.: 10/589,986

(22) PCT Filed: Feb. 22, 2005

(86) PCT No.: PCT/EP2005/001841
§ 371 (c)(1),
(2), (4) Date: Dec. 7, 2006

(87) PCT Pub. No.: WO2005/080465
PCT Pub. Date: Sep. 1, 2005

(65) Prior Publication Data
US 2008/0008838 A1 Jan. 10, 2008

(30) Foreign Application Priority Data

Feb. 23, 2004 (DE) .......................... 10 2004 008 772

(51) Int. Cl.
| C09D 7/12 | (2006.01) |
| C09D 133/00 | (2006.01) |
| C09D 163/00 | (2006.01) |
| C09D 167/00 | (2006.01) |
| C09D 177/00 | (2006.01) |
| C09D 179/02 | (2006.01) |
| C09D 179/04 | (2006.01) |
| C09D 179/08 | (2006.01) |
| C09D 127/12 | (2006.01) |
| C09D 129/10 | (2006.01) |
| C09D 175/04 | (2006.01) |
| C08K 3/04 | (2006.01) |
| C08K 3/14 | (2006.01) |
| C08K 3/22 | (2006.01) |
(Continued)

(52) U.S. Cl.
CPC ........ *C08G 18/3812* (2013.01); *C08G 18/5015* (2013.01); *C09D 163/00* (2013.01); *C09D 175/04* (2013.01); *B05D 3/00* (2013.01); *B05D 3/007* (2013.01); *B05D 3/02* (2013.01); *B32B 27/06* (2013.01); *B32B 27/26* (2013.01); *B32B 2255/26* (2013.01); *B32B 2307/554* (2013.01); *B32B 2307/584* (2013.01); *B32B 2307/714* (2013.01); *C08K 3/0008* (2013.01); *C08K 3/0033* (2013.01); *C08K 3/04* (2013.01); *C08K 3/14* (2013.01); *C08K 3/34* (2013.01); *C08K 3/36* (2013.01); *C08K 3/38* (2013.01); *C08K 3/40* (2013.01); *C08K 2003/2227* (2013.01);
*C08K 2003/3045* (2013.01); *C08L 27/12* (2013.01); *C08L 29/10* (2013.01); *C08L 33/00* (2013.01); *C08L 63/00* (2013.01); *C08L 67/00* (2013.01); *C08L 75/04* (2013.01); *C08L 77/00* (2013.01); *C08L 79/02* (2013.01); *C08L 79/04* (2013.01); *C08L 79/08* (2013.01); *C09D 7/1216* (2013.01); *C09D 7/1225* (2013.01); *C09D 127/10* (2013.01); *C09D 127/12* (2013.01); *C09D 133/00* (2013.01); *C09D 167/00* (2013.01); *C09D 177/00* (2013.01); *C09D 179/02* (2013.01); *C09D 179/04* (2013.01); *C09D 179/08* (2013.01); *Y10T 428/25* (2015.01); *Y10T 428/252* (2015.01); *Y10T 428/256* (2015.01); *Y10T 428/257* (2015.01); *Y10T 428/258* (2015.01); *Y10T 428/259* (2015.01); *Y10T 428/2991* (2015.01); *Y10T 428/2993* (2015.01); *Y10T 428/3154* (2015.04); *Y10T 428/31511* (2015.04); *Y10T 428/31551* (2015.04); *Y10T 428/31721* (2015.04); *Y10T 428/31725* (2015.04); *Y10T 428/31786* (2015.04)

(58) Field of Classification Search
None
See application file for complete search history.

(56) References Cited

U.S. PATENT DOCUMENTS 3,625,856 A * 12/1971 Schaefer et al. ................. 516/34
3,975,568 A *  8/1976 Rudness ........................ 428/329
(Continued)

FOREIGN PATENT DOCUMENTS

CA 2351333 A1 6/2000
DE 4212633    10/1993
(Continued)

OTHER PUBLICATIONS

"Sol (colloid)"—Wikipedia (en.wikipedia.org), 1 page retrieved Sep. 25, 2011.*
(Continued)

Primary Examiner — Vivian Chen
(74) Attorney, Agent, or Firm — Abel Law Group, LLP

(57) ABSTRACT

The invention relates to a composition for producing abrasion-resistant and alkali-resistant layers or molded bodies having a low-energy surface, said composition comprising a) a hardenable binder system containing at least one organic polymer or oligomer comprising at least one functional group, or a precursor thereof, b) at least one fluorine-containing polymer or oligomer containing at least one functional group that can react with a functional group of the binder system, and c) inorganic particles, and to the products thus obtained. The coatings and molded bodies obtained are especially suitable for surfaces to be kept clean.

36 Claims, No Drawings

(51) Int. Cl.

| | | |
|---|---|---|
| *C08K 3/34* | (2006.01) | |
| *C08K 3/36* | (2006.01) | |
| *C08K 3/38* | (2006.01) | |
| *C08K 3/40* | (2006.01) | |
| *C08K 3/30* | (2006.01) | |
| *C08K 5/092* | (2006.01) | |
| *C08K 5/17* | (2006.01) | |
| *B05D 3/00* | (2006.01) | |
| *B32B 27/26* | (2006.01) | |
| *C08L 33/00* | (2006.01) | |
| *C08L 63/00* | (2006.01) | |
| *C08L 67/00* | (2006.01) | |
| *C08L 77/00* | (2006.01) | |
| *C08L 79/02* | (2006.01) | |
| *C08L 79/04* | (2006.01) | |
| *C08L 79/08* | (2006.01) | |
| *C08L 27/12* | (2006.01) | |
| *C08L 29/10* | (2006.01) | |
| *C08L 75/04* | (2006.01) | |
| *C08G 18/38* | (2006.01) | |
| *C08G 18/50* | (2006.01) | |
| *C09D 127/10* | (2006.01) | |
| *C08K 3/00* | (2006.01) | |
| *B05D 3/02* | (2006.01) | |
| *B32B 27/06* | (2006.01) | |

(56) References Cited

U.S. PATENT DOCUMENTS

| | | | |
|---|---|---|---|
| 4,689,102 A * | 8/1987 | Prawdzik et al. | 156/235 |
| 4,816,516 A * | 3/1989 | Yamaya et al. | 525/180 |
| 4,857,619 A * | 8/1989 | Chou et al. | 526/249 |
| 5,093,403 A * | 3/1992 | Rau et al. | 524/404 |
| 5,250,085 A * | 10/1993 | Mevissen | 51/298 |
| 5,498,657 A * | 3/1996 | Sugiyama et al. | 524/463 |
| 5,562,991 A * | 10/1996 | Tannenbaum | 428/421 |
| 5,593,781 A * | 1/1997 | Nass et al. | 428/403 |
| 5,644,014 A | 7/1997 | Schmidt et al. | |
| 5,744,549 A | 4/1998 | Lutz | |
| 5,747,629 A | 5/1998 | Yeske et al. | |
| 5,874,489 A * | 2/1999 | D'Haenens et al. | 523/205 |
| 5,910,522 A | 6/1999 | Schmidt et al. | |
| 5,928,778 A * | 7/1999 | Takahashi et al. | 428/323 |
| 5,985,983 A * | 11/1999 | Yamada et al. | 524/520 |
| 6,008,285 A | 12/1999 | Kasemann et al. | |
| 6,039,796 A * | 3/2000 | Kubota et al. | 106/31.6 |
| 6,071,564 A | 6/2000 | Marchetti et al. | |
| 6,103,361 A * | 8/2000 | Batzar et al. | 428/323 |
| 6,124,045 A * | 9/2000 | Soda et al. | 428/500 |
| 6,174,928 B1 * | 1/2001 | Mizuide et al. | 521/46 |
| 6,225,434 B1 * | 5/2001 | Sadvary et al. | 427/407.1 |
| 6,228,796 B1 | 5/2001 | Arakawa et al. | |
| 6,228,921 B1 | 5/2001 | Kasemann et al. | |
| 6,232,372 B1 * | 5/2001 | Brothers et al. | 523/206 |
| 6,277,487 B1 * | 8/2001 | Soda et al. | 428/339 |
| 6,291,054 B1 * | 9/2001 | Thomas et al. | 428/141 |
| 6,291,070 B1 | 9/2001 | Arpac et al. | |
| 6,387,519 B1 * | 5/2002 | Anderson et al. | 428/447 |
| 6,448,328 B1 * | 9/2002 | Kappler et al. | 524/520 |
| 6,620,514 B1 | 9/2003 | Arpac et al. | |
| 6,703,131 B1 * | 3/2004 | Kayanoki | 428/446 |
| 6,737,145 B1 | 5/2004 | Watanabe et al. | |
| 6,761,964 B2 * | 7/2004 | Tannenbaum | 428/213 |
| 6,803,426 B2 * | 10/2004 | Coleridge et al. | 525/326.3 |
| 6,995,222 B2 * | 2/2006 | Buckanin | C09D 133/16 525/374 |
| 7,026,036 B2 * | 4/2006 | Leech et al. | 428/142 |
| 7,067,574 B2 * | 6/2006 | Tomihashi et al. | 524/376 |
| 7,332,545 B2 * | 2/2008 | Coca | C08F 214/18 525/326.3 |
| 7,354,648 B2 * | 4/2008 | Bate | 428/421 |
| 7,629,403 B2 * | 12/2009 | Campbell | 524/431 |
| 7,722,955 B2 * | 5/2010 | Audenaert | C08F 283/00 428/422 |
| 7,737,187 B2 * | 6/2010 | Yoshitake et al. | 516/34 |
| 8,420,763 B2 | 4/2013 | Yamane et al. | |
| 2001/0007710 A1 * | 7/2001 | Liu et al. | 428/207 |
| 2002/0002229 A1 * | 1/2002 | Thomas | A47J 36/02 524/430 |
| 2002/0004544 A1 | 1/2002 | Kolb et al. | |
| 2002/0059762 A1 * | 5/2002 | Takeuchi et al. | 52/311.1 |
| 2002/0193504 A1 | 12/2002 | Brueck et al. | |
| 2003/0191505 A1 | 10/2003 | Gryzwa et al. | |
| 2005/0137355 A1 * | 6/2005 | Buckanin | C09D 133/16 525/374 |
| 2011/0098402 A1 | 4/2011 | Yamane et al. | |

FOREIGN PATENT DOCUMENTS

| | | | |
|---|---|---|---|
| DE | 43 38 361 A1 | | 5/1995 |
| DE | 19746885 | | 6/1999 |
| EP | 0 443 863 | * | 8/1991 |
| EP | 0587667 | | 3/1994 |
| EP | 0812891 | | 12/1997 |
| EP | 0848023 | | 6/1998 |
| EP | 1141127 B1 | | 6/2000 |
| EP | 1 016 458 A2 | | 7/2000 |
| EP | 1 136 125 A1 | | 9/2001 |
| EP | 2316869 A1 | | 5/2011 |
| JP | 61164816 S | | 7/1986 |
| JP | 2-300253 A | | 12/1990 |
| JP | 04-292677 | * | 10/1992 |
| JP | 05105802 A | | 4/1993 |
| JP | 8-269156 A | | 10/1996 |
| JP | 10-72568 A | | 3/1998 |
| JP | 11-512948 A | | 11/1999 |
| JP | 2001-081131 | * | 3/2001 |
| KR | 10-2003-0034135 A | | 5/2003 |
| WO | 92/21729 | | 12/1992 |
| WO | 93/21127 | | 10/1993 |
| WO | WO 94/26830 | * | 11/1994 |
| WO | 96/31572 | | 10/1996 |
| WO | 97/46285 | | 12/1997 |
| WO | 98/51747 | | 11/1998 |
| WO | 01/30702 A1 | | 5/2001 |
| WO | 02/14066 A1 | | 2/2002 |

OTHER PUBLICATIONS

JP 2001-081131 (Mizuide et al) (Mar. 27, 2001) (machine translation).*

JP 2001-081131 (Mizuide et al) (Mar. 27, 2001) (full English translation).*

JP 04-0292677 (Iida et al) (Oct. 16, 1992) (full English translation).*

JP 2003-183565 (Tomihashi et al) (Aug. 3, 2003) (machine translation).*

U.S. Appl. No. 10/589,985 (Arpac et al.), filed Jan. 7, 2005 and entitled, "Amphiphilic Nanoparticles".

* cited by examiner

ABRASION-RESISTANT AND ALKALI-RESISTANT COATINGS OR MOULDED BODIES HAVING A LOW-ENERGY SURFACE

CROSS-REFERENCE TO RELATED APPLICATIONS

The present application is a U.S. National Stage of International Application No. PCT/EP2005/001841, filed Feb. 22, 2005, which claims priority of German Patent Application No. 10 2004 008772.5, filed Feb. 23, 2004.

BACKGROUND OF THE INVENTION

1. Field of the Invention

The present invention relates to a composition for the production of abrasion-resistant layers or shaped bodies with low-energy surface, to the coated substrates and shaped bodies producible therewith, and to processes for producing them and to their use.

2. Discussion of Background Information

The production of multifunctional layers with special properties, for example a combination of transparency, high abrasion resistance and specific surface chemistry properties, is today still a largely unsolved problem. For example, there are no low-energy layers which possess very high abrasion resistance apart from the known systems based on graphite or BN which are purely inorganic and are obtainable only by means of high-temperature processes. Abrasion resistance can be determined, for example, with a Taber abrasion machine.

It is known that polymers such as PTFE which have a low-energy surface are soft and have a low abrasion resistances. Although the filling of PTFE with abrasive particles improves the situation, it does not bring a satisfactory solution, since even these layers wear very rapidly in daily use. Moreover, such systems can be applied as layers only with difficulty and likewise have to be baked at relatively high temperatures.

EP 587667 (WO 92/21729) describes coatings with low-energy surface which, compared with PTFE, already have a significantly improved abrasion resistance. These coatings have a silicatic network, for which fluorinated silanes are also used. However, the low surface energy is virtually no longer detectable even after a relatively small number of cycles with a Taber abrasion machine, since the coating is a gradient layer in which the perfluorinated hydrocarbon groups which cause the low-energy surface can be found only in the uppermost region of the coating with respect to the surface.

Moreover, the coatings described in this patent, owing to the silicate network, are particularly sensitive to relatively high pH values, since materials with Si—O—Si linkages, for example glass, $SiO_2$ or else silicic acid heteropolycondensates, are known to be degraded hydrolytically very easily by alkalis. Thus, such layers are generally unsuitable, for example, for the alkaline cleaning processes used very frequently in industry, especially for degreasing. Even when such layers are subjected to a repeated machine dishwasher operation, this leads very rapidly to a loss of the low-energy properties, because this results especially in detachment of the perfluorinated side chain-bearing silanes by hydrolysis.

It is thus an object of the invention to find abrasion-resistant low-energy layers with increased alkali resistance and hence to overcome the disadvantages explained above.

The object is achieved by a composition which comprises
a) a curable binder system comprising at least one organic polymer or oligomer with one or more functional groups or a precursor thereof,
b) at least one fluorinated polymer or oligomer having at least one functional group which is reactive with a functional group of the binder system, and
c) inorganic particles.

The composition can be used to produce surprisingly abrasion-resistant layers with low-energy surface which additionally have improved alkali resistance. The composition is also suitable for producing shaped bodies with the same favorable properties.

SUMMARY OF THE INVENTION

The present invention provides a composition for the production of an abrasion-resistant and alkali-resistant coating or shaped body with a low-energy surface. The composition comprises
(a) a curable binder system comprising at least one organic polymer or oligomer with one or more functional groups or a precursor thereof,
(b) at least one fluorinated polymer or oligomer having at least one functional group which is reactive with a functional group of the binder system, and
(c) one or more types of inorganic particles.

In one aspect of the composition, component (b) may comprise one or more of a —$SO_3H$ group, a —$PO_3H$ group, an amino group, a carboxyl group and a hydroxyl group. For example, component (b) may comprise a fluorinated polyether and/or a fluoroethylene-alkyl vinyl ether copolymer.

In another aspect of the composition, component (c) may be present in an amount of from 5% to 60% by weight, based on the total weight of components (a), (b) and (c).

In yet another aspect, component (c) may comprise at least one ceramic material and/or may comprise at least one compound selected from one or more of oxides, nitrides, carbides, carbonitrides, silicides and borides and/or may comprise one or more of SiC, $B_4C$, $SiO_2$, $Al_2O_3$, $ZrO_2$ and $TiO_2$ and/or may comprise at least one abrasive material selected from diamond, granite, pumice, tripel, silicon carbide, emery, alumina, silica, gypsum and boron carbide and/or may comprise surface-modified particles and/or may comprise particles which are modified with one or more radicals which comprise an epoxy group or an amine group and/or may comprise particles having a mean particle diameter of from 0.1 µm to 100 µm, e.g., from 1 µm to 20 µm.

In a still further aspect of the composition of the present invention, component (a) thereof may comprise at least one of an epoxy resin, a polyol, an (unblocked or blocked) polyisocyanate, a polyester, a polyacrylate, a polyamine, a polyamide, a polyimide, a polybenzimidazole and precursors thereof and/or may comprise a crosslinking agent and/or a hardener such as, e.g., at least one of a (blocked or unblocked) isocyanate group, an acid anhydride group, an amine group and a hydroxyl group.

In another aspect, component (a) of the composition of the present invention may comprise one or more of a di- or tetracarboxylic acid, an anhydride thereof or another derivative thereof as a carboxylic acid component, and at least one of a diamine and a tetramine as an amine component, at least one of the carboxylic acid component and the amine component comprising an aromatic radical.

In another aspect, the composition may further comprise a solvent and/or at least one additive.

The present invention also provides a composition for the production of an abrasion-resistant and alkali-resistant coating or shaped body with a low-energy surface. The composition comprises (a) a curable binder system comprising one or more of an epoxy resin, a polyol, a polyisocyanate, a polyester, a polyacrylate, a polyamine, a polyamide, a polyimide, a polybenzimidazole and precursors thereof, (b) at least one fluorinated polymer or oligomer having at least one functional group which is reactive with a functional group of the binder system and comprises one or more of a —$SO_3H$ group, a —$PO_3H$ group, an amino group, a carboxyl group and a hydroxyl group, and (c) one or more types of inorganic particles which comprise at least one compound selected from one or more of oxides, nitrides, carbides, carbonitrides, silicides and borides and have a mean particle diameter of from 0.1 μm to 100 μm.

In one aspect of the composition, component (c) thereof may be present in an amount of from 5% to 60% by weight, based on the total weight of (a), (b) and (c), and/or may comprise surface-modified particles, and/or component (b) may comprise a fluorinated polyether and/or a fluoroethylene-alkyl vinyl ether copolymer.

In another aspect, component (a) may comprise one or more of a di- or tetracarboxylic acid, an anhydride thereof or another derivative thereof as a carboxylic acid component, and at least one of a diamine and a tetramine as an amine component, at least one of the carboxylic acid component and the amine component comprising an aromatic radical.

The present invention also provides a process for producing a substrate having an abrasion-resistant and alkali-resistant coating with a low-energy surface. The process comprises applying to the substrate a composition of the present invention as set forth above, including the various aspects thereof, and curing the applied composition.

The present invention also provides a substrate having an abrasion-resistant and alkali-resistant coating with low-energy surface. The coating of this substrate comprises a cured composition of the present invention as set forth above, including the various aspects thereof.

In one aspect, the coating may exhibit substantially no vertical concentration gradient of component (b) and/or the coating may be high-temperature-resistant and/or the coating may exhibit an abrasion value, measured after 1,000 cycles on a Taber abrasion apparatus, of less than 5 mg, e.g., of not more than 3 mg, and/or the coating may exhibit a contact angle with respect to water, measured on a smooth surface, of at least 80° and/or a contact angle with respect to hexadecane, measured on a smooth surface, of at least 45°, e.g., at least 50°.

The present invention also provides a process for producing an abrasion-resistant and alkali-resistant shaped body with a low-energy surface. The process comprises shaping a composition of the present invention as set forth above, including the various aspects thereof, and curing the shaped composition.

The present invention also provides an abrasion-resistant and alkali-resistant shaped body. The shaped body comprises a cured composition of the present invention as set forth above, including the various aspects thereof.

The present invention also provides a method of keeping an object or built structure clean. The method comprises providing the object or built structure with a coating which comprises a cured composition of the present invention as set forth above, including the various aspects thereof, or producing the object or built structure from the composition of the present invention as set forth above, including the various aspects thereof.

DETAILED DESCRIPTION OF THE INVENTION

Surprisingly, the compositions according to the invention afford coatings which are exceptionally abrasion-resistant. The abrasion values measured with a Taber abrasion machine (Taber Abrader) with 1000 cycles are in some cases within the measurement accuracy of a precision balance, i.e. they cannot be determined, or in favorable cases are not more than up to 3 mg.

However, it is particularly surprising that the contact angles which are measured by the experiments with the Taber abrasion machine barely differ from the values determined before the experiment. If at all, they even tend toward higher values, i.e. toward a better low-energy performance. This means that the effect of the low-energy surfaces obtained by means of the fluorinated fractions is preserved fully even when the uppermost surface layers are worn off.

Surface energy is a property both of solid and of liquid materials. Solid materials with a surface with low surface energy, also referred to as low-energy surface, may exhibit, for example, hydrophobic and oleophobic properties. These can be detected via the contact angle with respect to liquid media. These connections are known to those skilled in the art. Low-energy surfaces are frequently obtained by presence of fluorinated hydrocarbon groups.

The low-energy surfaces which are obtained in accordance with the present invention preferably have a contact angle, measured on a smooth surface, with respect to water of at least 80° (hydrophobic properties) and a contact angle, measured on a smooth surface, with respect to hexadecane of at least 45° and preferably at least 50° (oleophobic properties).

The object is achieved not by starting from silanes perfluorinated on side chains as starting components and carriers of the low-energy surface, but rather selecting fluorinated polymers or oligomers, preferably functional short-chain fluorooligomers, with functional groups, preferably with OH groups, as starting compounds, and reacting them with curable binder systems in the presence of powders, preferably abrasive powders, to give polymers. The invention is illustrated in detail below.

The composition comprises a) a curable binder system comprising at least one organic polymer or oligomer having one or more functional groups or a precursor thereof. They may be the customary binder systems used for coating compositions or for molding materials. The binder systems comprise especially the customary organic resins. The binder systems may be physically or preferably chemically curing systems. The systems may be oxidatively curing, cold-curing or thermally curing or irradiation-curable systems. The coating materials may be one- or two-component coating materials. The binder systems are preferably chemically curable or crosslinkable binder systems. Such curable binder systems are familiar to those skilled in the art.

The usable binder systems or coating materials or the polymers or oligomers or precursors thereof used therefor are, for example, the customary binder systems known from the prior art, as described, for example, in Ullmanns, Encyklopadie der technischen Chemie, vol. 15, 4th ed., 1978, p. 589 ff. In particular, they are organic polymers, oligomers or precursors thereof. The precursors of the polymers or oligomers are understood to mean the monomers or low molecular weight polymerization, condensation or addition products formed therefrom, from which the polymers or oligomers are derived.

Examples of binder systems or coating materials or the organic polymers or oligomers used therefor are oil-based coating materials which comprise oils, for example linseed oil, wood oil or soybean oil, which have optionally been modified with polybutadiene oils; nitrocellulose coating materials which comprise nitrocelluloses; coating materials composed of cellulose esters of organic acids, such as esters or cellulose with acetic acid or butyric acid or the anhydrides thereof, of which, for example, cellulose acetobutyrates also find use in polyurethane coating materials; chlorinated rubber coating materials which comprise, for example, chlorinated polyisoprene, polypropylene or polyethylene; coating materials composed of polyvinyl compounds or polyvinyl resins such as polyolefins, e.g. polyethylene, ethylene-vinyl acetate copolymers and ethylene-maleic acid/anhydride copolymers, PVC, polyvinylidene chloride, polyvinyl alcohol, polyvinyl acetals, e.g. polyvinyl butyral, polyvinyl ethers, e.g. methyl or ethyl ether, polyvinyl esters, e.g. polyvinyl acetate (PVA) and polyethylene terephthalate, polyvinylpyrrolidone, polystyrene, styrene-acrylonitrile copolymers (SAN), acrylonitrile-butadiene-styrene copolymers (ABS), styrene-maleic ester copolymers, styrene-butadiene copolymers and styrene-maleic anhydride copolymers; coating materials based on acrylic resins such as polyacrylic acid, polymethacrylic acid, polyacrylamide, acrylic esters or methacrylic esters, for example polymethyl (meth)acrylate; alkyd resins which comprise dibasic acids or anhydrides such as phthalic acid and phthalic anhydride, and polyols or condensation products thereof which have been oleic acid- or fatty acid-modified; saturated polyester resin coating materials which comprise saturated polyesters of saturated monomers with two or more functional groups (OH and/or COOH groups); polyurethane coating materials which are frequently used as two-component systems and comprise blocked or unblocked polyisocyanates and polyhydroxyl compounds; epoxy resin coating materials such as bisphenol A resins, bisphenol F resins, aliphatic and heterocyclic epoxy resins or thermoplastic epoxy coating material resins; silicone resin coating materials; urea, melamine and phenol resin coating materials; and also polyarylates, polyamides, polyethers, polyimides and polycarbonates. It is also possible to use combinations of these coating materials or these polymers. It is always also possible to use the precursors, for example the monomers of the polymers or oligomers mentioned.

Preferred binder systems are polyurethane coating materials and polyepoxide resin coating materials. Also likewise suitable are polyamides, polyimides or polybenzimidazoles or precursors thereof, especially because this allows particularly high-temperature-stable systems to be obtained, preference being given to those which comprise aromatic groups.

The binder comprises an organic polymer or oligomer or a precursor thereof with one or more functional groups. Examples of appropriate functional groups are C—C double bonds, hydroxy, amino, carboxyl, acid anhydride groups, epoxy and/or isocyanate groups. Further examples are acid chloride groups, nitrile, isonitrile and SH groups.

It will be appreciated that the functional groups are selected such that the desired curing reactions can take place. It is possible for only one functional group to be present which is reactive with itself, or two or more groups which are reactive with one another. The groups may be present on the same or on different polymers, oligomers or precursors thereof, or a group may be introduced via a hardener or crosslinker. The connections are known to those skilled in the art. The binder system also comprises the hardeners or crosslinkers used if appropriate. It is preferably one of these functional groups which is reactive with a functional group of the fluorinated polymer or oligomer. However, it may also be an independent functional group which is reactive only with the functional group of the fluorinated polymer or oligomer.

Organic polymers or oligomers or precursors thereof, such as monomers, used with preference are polyepoxides, polyols, unblocked or especially blocked polyisocyanates, polyesters, polyamines, polycarboxylic acids or polycarboxylic anhydrides, each of which contain two or more functional groups. Here, the expression "poly" refers to the functional group and not to the degree of polymerization. Accordingly, the polyols possess two or more hydroxyl groups and the molecule may be a monomer, oligomer or polymer (for example a polyurethane). Specific components are illustrated by way of example for preferred binder systems below.

Polyisocyanates are used, for example, for polyurethane resins. The polyisocyanate may have two or more isocyanate groups. It may, for example, be aliphatic, alicyclic, aromatic or heterocyclic, monocyclic or polycyclic.

It is possible to use customary polyisocyanates, for example monomeric polyisocyanates, polyisocyanate adducts, so-called modified polyisocyanates or mixtures thereof. These are known to those skilled in the art and are commercially available and are described, for example, in G. Oertel, Polyurethane Handbook, Hanser-Verlag 1993 and in "Methoden der organischen Chemie" [Methods of organic chemistry] (Houben-Weyl), vol. 14/2, Thieme Verlag, 1963. The adducts may, for example, have a mean NCO functionality of from 2 to 6, preferably from 2.4 to 4.

The polyisocyanate adducts are, for example, those which find use typically as hardeners for two-component urethane coating systems and are described in "Lackharze: Chemie, Eigenschaften und Anwendungen", [Resin coating materials: chemistry: properties and applications], eds. D. Stoye, W. Freitag, Hanser Verlag Munich, Vienna, 1996.

Examples of suitable polyisocyanates are the diisocyanates known from polyurethane chemistry, for example 1,3-diisocyanatobenzene, 2,4- and 2,6-tolylene diisocyanate (TDI), 1,6-hexamethylene diisocyanate (HMDI), 4,4'- and 2,4'diphenylmethane diisocyanate (MDI), naphthylene diisocyanate, xylylene diisocyanate, isophorone dissocyanate, paraphenyl diisocyanates, dicyclohexylmethane diisocyanate, cyclohexyl diisocyanate, polymethylpolyphenyl isocyanate, 1,6-dodecamethylene diisocyanate, 1,4-bis(isocyanatocyclohexyl)methane, pentamethylene diisocyanate, trimethylene diisocyanate, triphenylmethane diisocyanate, and the higher molecular weight polyisocyanates derived from these diisocyanates, for example based on isocyanurate, uretdione, allophanate and biuret. The isocyanates are obtainable, for example, under the trade names Desmodur® and Baymidur® (from Bayer) CARADATE® (from Shell), TEDIMON® (from Enichem) and LUPRANAT® (from BASF). Examples of monomeric polyisocyanates having more than two isocyanate groups are, for example, 4-isocyanatomethyl-1,8-octane diisocyanate and aromatic polyisocyanates such as 4,4',4"-triphenylmethane triisocyanate or polyphenolpolymethylene polyisocyanates.

The polyisocyanate can be used in blocked form in order to prevent an uncontrolled, rapid reaction from setting in, and become active only after deblocking, for example by heating. The blocking of isocyanates is a process known to those skilled in the art for reversibly lowering the reactivity of isocyanates. To block the isocyanates, all common blocking agents are useful, for example acetone oxime, cyclohexanone oxime, methyl ethyl ketoxime, acetophenone oxime, benzophenone oxime, 3,5-dimethylpyrazole, 1,2,4-triazole, ethyl malonate, ethyl acetate, ε-caprolactam, phenol or ethanol.

The polyol component used may be pure di-, tri- or polyalcohols, for example ethylene glycol, trimethylolpropane, or partially hydrolyzed fatty acid glycerides. However, these are commonly used only as the starting basis for higher molecular weight polyhydroxyl compounds. These may be, for example, more or less highly branched polyester polyols (Desmophen® types) formed with dicarboxylic acids or polyether polyols formed by addition of epoxides (Desmophen U® types). Other examples are hydroxy-functional acrylic resins (Desmophen A® types).

Polyurethane resin coating materials can be formed from the polyisocyanates and the polyols. Of course, in particular in the case of unblocked polyisocyanates, it may be necessary to mix the components with one another only shortly before use. Polyisocyanates may also be reacted with compounds having other functional groups which contain active hydrogen. Examples of these groups are thiol groups (—SH), primary or secondary amino groups (—NHR' where R' may, for example, be H, alkyl, cycloalkyl, aryl and corresponding aralkyl and alkaryl groups) or carboxyl groups (—COOH). The reaction products formed in the reaction with isocyanates are urethanes (in the case of hydroxyl and carboxyl), thiourethanes (in the case of thiol) or ureas (in the case of amine).

Examples of polyepoxides are bisphenol A resins (e.g. condensation products of bisphenol A and epichlorohydrin), bisphenol F resins (e.g. condensation products of bisphenol F and epichlorohydrin), aliphatic epoxy resins (e.g. low-viscosity glycidyl ethers), cycloaliphatic epoxy resins and heterocyclic epoxy resins (e.g. triglycidyl isocyanurate) or thermoplastic epoxy resin coating materials. Frequently, polyepoxide resins are admixed with hardeners for the film formation, in order to achieve crosslinking. Useful hardeners include organic or inorganic compounds with reactive hydrogen, which can react with epoxy- or hydroxyl groups. Examples of hardeners used are polyamines, polyaminoamide resins, polyisocyanates, hydroxyl-containing synthetic resins such as urea, melamine and phenol resins, fatty acids and organic acids with reactive double bonds, such as acrylic acid or methacrylic acid. When the latter hardeners are used, the crosslinking may also be effected by electron radiation.

Polyamides are condensation products of diamines and dicarboxylic acids or derivatives thereof, and aliphatic and/or aromatic compounds may be used. Polyamides with aromatic units are of interest especially with regard to thermal stability. Also notable for high heat resistance are polyimides, for example polycondensates of aromatic diamines such as benzidine, 4,4-diaminodiphenyl ether or 4,4'-bis (3-aminophenoxy)diphenyl sulfone, and aromatic tetracarboxylic acids or derivatives thereof such as 4,4'-benzophenonetetracarboxylic dianhydride or pyromellitic dianhydride, and polybenzimidazoles which are condensation products of aromatic tetramines and dicarboxylic acids or derivatives thereof. In the inventive composition, the corresponding monomers or low molecular weight condensation products may be used for the polymers mentioned.

The aforementioned binder systems are suitable in particular for coating compositions. However, they are also suitable as binder systems for molding materials for producing shaped bodies, shaped bodies also including films. Epoxy resins or polyurethane resins are, for example, also very suitable for producing shaped bodies. Further binder systems which are used preferentially for shaped bodies are phenol-formaldehyde resins, amino resins such as urea-formaldehyde resins and melamine-formaldehyde resins, unsaturated polyester resins, crosslinkable methacrylate resins which comprise mixtures of prepolymerized and monomeric methacrylic esters, mixtures of prepolymerized and monomeric products based on butadiene and styrene, silicones, polysulfides and acrylate resins.

The composition comprises at least one fluorinated polymer or oligomer having at least one functional group which is reactive with a functional group of the binder system (including hardener or crosslinker). The molecules are preferably oligomers, especially functional short-chain fluorooligomers, the functional group preferably being a carboxyl group and more preferably a hydroxyl group.

Suitable polymers or oligomers are all of those which are fluorinated and have at least one functional group which is reactive with a functional group of the binder system.

In principle, all of these polymers or oligomers may be based on the aforementioned polymers when they have fluorine substitution. Appropriate polymers or oligomers here are fluorinated polyethers, especially perfluoropolyethers. Other examples are fluorinated epoxides and fluorinated polyurethanes. An example of a monomer which is suitable for introduction of fluorine atoms into epoxy or polyurethane resin systems is the diglycidyl ether of 1,3,5-fluoroalkylbenzene.

It is also possible to use copolymers, in which case one monomer type is fluorinated, for example customary fluoromonomers such as tetrafluoroethylene, perfluoropropylene, trifluorochloroethylene, vinylidene fluoride and hexafluoropropylene, and one monomer type is copolymerizable therewith and comprises a functional group, for example vinyl compounds which possess a functional group, such as vinyl ethers, vinyl esters, vinyl alcohols, vinyl acetates, vinylamines which have a functional group or are substituted therewith. One example is a fluoroethylene-alkyl vinyl ether copolymer, in which the alkyl group (for example linear or branched $C_1$-$C_8$ alkyl such as methyl, ethyl, n-propyl, isopropyl or n-, sec- or tert-butyl) is substituted by a suitable functional group, for example OH, COOH or oxyalkylol ([—O—$(CH_2)_n]_x$—OH where n is the same or different and is from 1 to 8 and x is from 1 to 3). The fluoroethylene may, for example, be tetrafluoroethylene or trifluorochloroethylene. The copolymer may contain one alkyl vinyl ether or different alkyl vinyl ethers, for example those having a functional group and those without a functional group. It is also possible for copolymers of tetrafluoroethylene and perfluoroalkyl vinyl ethers to find use.

It is also possible to introduce sulfonic acid or phosphonic acid groups via copolymerization, for example by copolymerization of tetrafluoroethylene with trifluorovinyl sulfochloride or perfluorovinyl ether sulfofluorides. Polytetrafluoroethylene is also functionalizable by graft polymerization with the abovementioned vinyl compounds or acrylic acids.

Such fluorinated polymers or oligomers with functional groups are commercially available, for example Lumiflon® from Asahi Glass Co. Ltd. or Fluorolink® from Solvay Solexis. Preferred fluorinated polymers or oligomers with at least one functional group are fluorinated polyethers, preferably perfluoropolyethers, and fluoroethylene-alkyl vinyl ether copolymers, the fluoroethylene preferably being tetrafluoroethylene and/or trifluoromonochloroethylene.

The functional group of the fluorinated polymer or oligomer is reactive with a functional group of the binder system. It may preferably be the functional group in the binder system which also enters into the curing or crosslinking reactions. However, it may also be a group independent thereof. The fluorinated polymer or oligomer may have one or more functional groups. The chemical binding reaction incorporates the fluorinated polymer or oligomer into the binder system. It may optionally also assume the function of a hardener or crosslinker and optionally partly or fully replace those which are otherwise customary.

Suitable functional groups are in principle the same as have already been mentioned for the polymer, i.e. C—C double bonds, hydroxyl, amino, carboxyl, acid anhydride groups, epoxy, isocyanate groups, acid chloride groups, nitrile, isonitrile and SH groups. Also suitable are —$SO_3H$ groups and —$PO_3H$ groups. Preference is given to amino, hydroxyl and carboxyl groups, preference being given to carboxyl and especially to hydroxyl groups.

The functional groups of course have to be adjusted to one another. When, for example, instead of the fluorinated polymers or oligomers with OH groups, those with COOH groups are used, it is, for example, appropriate to use acid anhydrides as epoxy crosslinkers.

As stated, a fluorinated polymer or oligomer may be used, preference generally being given to an oligomer. The molecular weight of the polymers or oligomers may vary within wide ranges. When oligomers are used, an appropriate molecular weight (weight-average) may frequently, for example, be in the range of at least 100, more appropriately at least 500 or preferably at least 600, and up to 5000, more appropriately up to 3000 and preferably up to 1500 or up to 1000.

Moreover, the composition comprises inorganic particles. Suitable particles are virtually all ceramic and glass systems, but also in some cases metals, semiconductors and customary fillers. They are preferably ceramic particles. Frequently, oxides, nitrides, carbides, carbonitrides, silicides or borides are used. It is also possible to use mixtures of different particles. Preference is given to using abrasive particles or hard substances. The particles may be surface-modified or -unmodified.

The particles are, for example, particles of metal including metal alloys, semimetal (e.g. B, Si and Ge) or metal compounds, in particular metal chalcogenides, more preferably the oxides and sulfides, nitrides, carbides, silicides and borides. It is possible to use one type of particles or a mixture.

Examples are (optionally hydrated) oxides such as ZnO, CdO, $SiO_2$, $GeO_2$, $TiO_2$, $ZrO_2$, $CeO_2$, $SnO_2$, $Al_2O_3$ (e.g. Amperit, boehmite, AlO(OH), also in the form of aluminum hydroxide), $B_2O_3$, $In_2O_3$, $La_2O_3$, $Fe_2O_3$ (e.g. hematite), $Fe_3O_4$, $Cu_2O$, $Ta_2O_5$, $Nb_2O_5$, $V_2O_5$, $MoO_3$ or $WO_3$; further chalcogenides, for example sulfides (e.g. CdS, ZnS, PbS and $Ag_2S$), selenides (e.g. GaSe, CdSe and ZnSe) and tellurides (e.g. ZnTe or CdTe); halides such as AgCl, AgBr, AgI, CuCl, CuBr, $CdI_2$ and $PbI_2$; carbides such as $CdC_2$ or SiC; arsenides such as AlAs, GaAs and GeAs; antimonides such as InSb; nitrides such as BN, AlN, $Si_3N_4$ and $Ti_3N_4$; phosphides such as GaP, InP, $Zn_3P_2$ and $Cd_3P_2$; phosphates, silicates including relatively complex silicates, for example sheet silicates, talc, zirconates, aluminates, stannates and the corresponding mixed oxides (e.g. indium tin oxide (ITO), antimony tin oxide (ATO), fluorine-doped tin oxide (FTO), luminescent pigments comprising Y- or Eu-containing compounds, spinels, ferrites or mixed oxides with perovskite structure such as $BaTiO_3$ and $PbTiO_3$). Also useful are customary pigments and fillers, for example graphite, sulfates such as barite and gypsum, carbonates such as calcites, dolomites and chalks, sulfides such as zinc sulfide or lithopones, glass, and also oxides and silicates such as silicas, cristobalite, talc, kaolin and mica, provided that they are insoluble in the selected medium.

Preference is given to using abrasive powders for the particles. Examples of abrasive or hard powders, which are also referred to as abrasives, are powders of diamond, granite, pumice, tripel, silicon carbide, emery, aluminas, for example amperit and corundum, silicas such as kieselguhr, quartz or abrasive sands, gypsum, boron carbide and other oxides, borides, silicides, carbides, carbonitrides and nitrides.

The particles are preferably selected from the group of SiC, $B_4C$, modified and unmodified $SiO_2$, especially quartz, $Al_2O_3$, $ZrO_2$ and $TiO_2$.

The particle size of the particles is not particularly restricted. Appropriately, the mean particle diameter is, for example, in the range from at least 0.1 μm, preferably at least 0.5 μm and more preferably at least 1 μm up to not more than 100 μm, more preferably not more than 50 μm and particularly preferably not more than 20 or 10 μm. It is also possible to use mixtures of particles of different particle size. For example, SiC UF-10 with coarser UF-05 and even finer UF-15 can be used in combination. In addition, it is also possible to add finer particle fractions down to the nm range, as are customary, for example, in nanocomposites which are described, for example, in DE 4212633; they may be nanoscale solid particles which will be described later. It is also possible to use very fine particles of such nanoscale solid particles with a mean particle diameter below 0.1 μm alone.

As in the later data too, the mean particle diameter is based on the volume average determined, the distributions being determined by using laser diffraction processes (evaluation according to Mie) in the particle size range from 1 to 2000 μm and a UPA (ultrafine particle analyzer, Leeds Northrup (laser optics)) in the range from 3.5 nm to 3 μm. In the range of intersection from 1 to 3 μm, reference is made here to the measurement with UPA.

The particles used may also be surface-modified. For example, $SiO_2$ particles, especially quartz particles, may be surface-modified with epoxy or amino groups or other functional groups.

The modification of particle surfaces is a known process, as described by the applicant for nanoscale solid particles, for example, in WO 93/21127 or WO 96/31572. The preparation of the surface-modified particles can in principle be carried out in two different ways, specifically firstly by modifying already prepared particles and secondly by preparing particles with use of one or more compounds which possess appropriate functional moieties.

The modifying agent can be used to attach functional groups on the surface of the particles. Examples are the functional groups mentioned above for the binder systems and the fluorinated polymer or oligomers, such as (meth)acryloyl, epoxy, thiol, carboxy, carboxylic anhydride or amino groups.

Suitable modifying agents in addition to inorganic or organic acids are also low molecular weight organic compounds or low molecular weight hydrolyzable silanes with at least one unhydrolyzable group which can react and/or (at least) interact with groups present on the surface of the particles. For example, reactive groups as residual valences are present as surface groups on particles, such as hydroxyl groups and oxy groups, for example in the case of metal oxides, or thiol groups and thio groups, for example in the case of metal sulfides, or amino, amide and imide groups, for example in the case of nitrides.

A modification of the particles can be effected, for example, by mixing the nanoscale particles with modifying agents expressed below, optionally in a solvent and in the presence of a catalyst. Of course, appropriate conditions such as temperature, quantitative ratios, duration of the reaction, etc., depend upon the particular specific reactants and the desired degree of coverage.

The modifying agents may, for example, form either covalent or ionic (salt-type) or coordinative bonds to the surface of the particles, while the pure interactions include, by way of example, dipole-dipole interactions, hydrogen bonds and van der Waals interactions. Preference is given to the formation of covalent, ionic and/or coordinative bonds. A coordinative bond is understood to mean complex formation. Between the surface modifier and the particle, for example, a Brønsted or Lewis acid/base reaction, complex formation or esterification may take place.

Examples of suitable functional groups of the surface modifiers for attachment to the particles are carboxylic acid groups, anhydride groups, amide groups, (primary, secondary, tertiary and quaternary) amino groups, SiOH groups, hydrolyzable radicals of silanes and C—H acidic moieties, e.g. β-dicarbonyl compounds. It is also possible for a plurality of these groups to be present simultaneously in one molecule (betaines, amino acids, EDTA, etc.).

Examples of compounds which are used for surface modification are optionally substituted (for example by hydroxyl), saturated or unsaturated mono- and polycarboxylic acids which have from 1 to 24 carbon atoms and may also contain ether bonds, and also their anhydrides, esters (preferably $C_1$-$C_4$-alkyl esters) and amides, for example methyl methacrylate.

Examples of further suitable surface modifiers are quaternary ammonium salts of the formula $NR^1R^2R^3R^{4+}X^-$ where $R^1$ to $R^4$ are optionally different aliphatic, aromatic or cycloaliphatic groups having preferably from 1 to 12, in particular from 1 to 8 carbon atoms, for example alkyl groups having from 1 to 12, in particular from 1 to 8 and more preferably from 1 to 6 carbon atoms (e.g. methyl, ethyl, n- and i-propyl, butyl or hexyl), and $X^-$ is an inorganic or organic anion, for example acetate, $OH^-$, $Cl^-$, $Br^-$ or $I^-$; monoamines and polyamines, especially those of the general formula $R_{3-n}NH_n$ where n=0, 1 or 2 and the R radicals are each independently alkyl groups having from 1 to 12, in particular from 1 to 8 and more preferably from 1 to 6 carbon atoms (e.g. methyl, ethyl, n- and i-propyl, butyl or hexyl) and ethylene polyamines (e.g. ethylenediamine, diethylenetriamine, etc.); amino acids; imines; β-dicarbonyl compounds having from 4 to 12, in particular from 5 to 8 carbon atoms, for example acetylacetone, 2,4-hexanedione, 3,5-heptanedione, acetoacetic acid and $C_1$-$C_4$-alkyl acetoacetates such as ethyl acetoacetate; and silanes.

For the modification, it is possible to use hydrolyzable silanes, in which case the silane has an unhydrolyzable group. This surface modification with hydrolyzable silanes is appropriate especially for $SiO_2$. Examples are silanes of the general formula:

$$R_nSiX_{(4-n)} \quad (I)$$

where the X radicals are the same or different and are each hydrolyzable groups or hydroxyl groups, the R radicals are the same or different and are unhydrolyzable groups, and n is 1, 2 or 3, or an oligomer derived therefrom.

In the general formula (I), the hydrolyzable X groups, which may be the same or different from one another, are, for example, hydrogen or halogen (F, Cl, Br or I), alkoxy (preferably $C_{1-6}$-alkoxy, for example methoxy, ethoxy, n-propoxy, i-propoxy and butoxy), aryloxy (preferably $C_{6-10}$-aryloxy, for example phenoxy), acyloxy (preferably $C_{1-6}$-acyloxy, for example acetoxy or propionyloxy), alkylcarbonyl (preferably $C_{2-7}$-alkylcarbonyl, for example acetyl), amino, monoalkylamino or dialkylamino having preferably from 1 to 12, in particular from 1 to 6 carbon atoms. Preferred hydrolyzable radicals are halogen, alkoxy groups and acyloxy groups. Particularly preferred hydrolyzable radicals are $C_{1-4}$-alkoxy groups, in particular methoxy and ethoxy.

The unhydrolyzable R radicals, which may be the same or different from one another, may be unhydrolyzable R radicals with a functional group through which, for example, crosslinking may be possible, or unhydrolyzable R radicals without a functional group. The unhydrolyzable R radical is, for example, alkyl, alkenyl, alkynyl, aryl or else corresponding alkylaryls and arylalkyls. The R and X radicals may optionally have one or more customary substituents, for example halogen or alkoxy.

Specific examples of functional groups for the R radical are, for example, an epoxy, hydroxy, ether, amino, monoalkylamino, dialkylamino, carboxy, acryl, methacryloyl, isocyanato, alkylcarbonyl, acid anhydride and phosphoric acid group. These functional groups are bonded to the silicon atom via alkylene, alkenylene or arylene bridging groups which may be interrupted by oxygen or NH groups. Of course, the R radical may also have more than one functional group.

For the in situ preparation of nanoscale inorganic solid particles with polymerizable/polycondensable surface groups, reference is made to WO 98/51747 (DE 19746885).

In a preferred embodiment, the particles may interact, via above-described reactive groups on the surface or especially via functional groups which have been applied by above-described modification on the surface, likewise with the binder system and/or the fluorinated polymers or oligomers, especially via a bond to the functional groups present therein, so that improved incorporation of the particles into the matrix which forms is enabled.

The unmodified and modified particles are known to those skilled in the art and are for the most part commercially available.

The amount of particles in the composition can vary. A suitable amount of particles is frequently, for example, at least 5% by weight, for example in the range from 10 to 60% by weight or from 10 to 50% by weight, based on the binder system (including any hardener and crosslinker used, without solvent) (component a), the fluorinated polymer or oligomer (component b) and the particles (component c). The amount of fluorinated polymer or oligomer in the composition may also vary. An appropriate amount may, for example, frequently be in the range from 1 to 50% by weight based on components a), b) and c). The amount of binder system (component a) is also variable; for example, at least 2 or at least 5% by weight, based on components a), b) and c), may be present.

When the curing or crosslinking is effected via two or more different functional groups which can react with one another and are, for example, each present in the binder and in the crosslinker, the molar ratio of the first group of functional groups to the second group of functional groups which are reactive with the first should be, for example, approximately 1:1, although molar ratios deviating therefrom are also possible.

When the powders are admixed in concentrations between 10 and 60% by weight, it has been found that, surprisingly, in spite of this high proportion of particles, contact angles of around 90 to 100° with respect to water and around 60 to 70° with respect to hexadecane can be achieved, which implies a very oleophobic surface (low-energy surface).

The composition may comprise further additives which, in industry, are customarily added to coating compositions or compositions for shaped bodies depending on the purpose and desired properties. Specific examples are thixotropic agents, solvents or dispersants, organic and inorganic color pigments, nanoscale inorganic solid particles, metal colloids, for example as carriers of optical functions, dyes, antioxidants, UV absorbers, lubricants, flow control agents, wetting agents, adhesion promoters and catalysts. For shaped bodies, it is possible to use, for example, resin carriers, for example textile fibers.

The addition of commercial pigments of any type into the compositions may serve, for example, to achieve specific color effects or conductivity effects (carbon black). The composition may comprise catalysts. Examples of catalysts for polyurethane resins are tin compounds or amines. Usable nanoscale solid particles have a mean particle diameter of, for example, below 50 nm and generally at least 1 or 2 nm. They may consist of the same materials as the above-described particles, preference generally being given to the oxides. They may also be surface-modified or doped. One example of a suitable lubricant is graphite.

The solvents (dispersants) used may, for example, be solvents customary for coatings. A suitable solvent is water. Suitable organic solvents are either polar or nonpolar and aprotic solvents. Examples thereof are alcohols, preferably lower aliphatic alcohols ($C_1$-$C_8$ alcohols), such as methanol, ethanol, 1-propanol, i-propanol and 1-butanol, ketones, preferably aliphatic ketones such as acetone, methyl ketone and methyl isobutyl ketone, esters such as 2-methoxypropyl acetate, butyl acetate and ethyl acetate, ethers, preferably lower dialkyl ethers such as diethyl ether, cyclic ethers such as dioxane or THF, or monoethers of diols, such as ethylene glycol or propylene glycol with $C_1$-$C_8$ alcohols, aromatic or aliphatic hydrocarbons such as hexane, heptane, petroleum ether, toluene and xylene, amides such as diemethylformamide and mixtures thereof. When blocked isocyanates are used, protic solvents should have a boiling point below the deblocking temperature of the blocked isocyanate in order to minimize side reactions. Examples are aliphatic alcohols having from 1 to 4 carbon atoms. Also suitable are high-boiling solvents such as methyl-2-pyrrolidone (NMP).

The compositions are preferably used as coatings. When the composition is used as a coating composition, all customary materials may be coated. Examples of a suitable substrate are substrates made of metal, semiconductors, glass, ceramic including porous ceramics, glass ceramic, plastic, wood, paper, building materials or inorganic-organic composite materials. The substrates may be pretreated, for example by a corona treatment or with a preliminary coating such as a lacquer coating (lacquered surfaces), an enamel coating, a paint coating or a metalized surface, or by impregnation.

Examples of metal substrates include, for example, copper, aluminum, brass, iron, steel and zinc. Examples of semiconductors are silicon, for example in the form of wafers, and indium tin oxide layers (ITO layers) on glass. The glass used may be any conventional glass types, for example silica glass, borosilicate glass or soda-lime silicate glass. Examples of plastic substrates are polycarbonate, polymethyl methacrylate, polyacrylates, polyethylene terephthalate. Especially for optical or optoelectronic applications, transparent substrates are suitable, for example of glass or plastic. Examples of building materials are stones, concrete, tiles, plasterboard or bricks.

The composition may be applied to the substrate in any customary manner. It is possible to use all common coating processes. Examples are spin-coating, (electro) dip-coating, knife-coating, spraying, squirting, casting, painting, flow-coating, knife-casting, slot-coating, meniscus-coating, curtain-coating and roller application.

To produce shaped bodies, the compositions are shaped, for which the customary processes, for example extrusion, injection molding, casting and compression molding can likewise be used.

This is followed by curing. Since the curing, by its nature, depends essentially upon the binder systems used, no specific statements can be made. Those skilled in the art know what curing conditions are appropriate for the particular known binder systems. As stated, the systems may be oxidatively curing, cold-curing or thermally curing or irradiation-curable systems.

In a particularly preferred embodiment, functional short-chain fluorooligomers, preferably with OH groups, are used as starting compounds, and they are reacted with blocked isocyanates or epoxides in the presence of abrasive powders, for example aluminum oxide or silicon carbide, to give polymers. Both the deblocked isocyanates and the epoxides may, for example, react with OH groups which are bonded to the fluorooligomers.

It is another preferred variant to convert such fluorinated oligomers in the presence of monomers for polyamides, polyimides or polybenzimidazoles in the presence of such powders to give polymers. Suitable monomers here are a carboxylic acid component such as di-, tri- or tetracarboxylic acids or higher polycarboxylic acids, preferably di- or tetracarboxylic acids, or derivatives thereof, especially the anhydrides, and an amine component, for example di-, tri- or tetramines or higher polyamines, preferably di- or tetracarboxylic acids, at least one component and preferably both components comprising an aromatic group on which the functional groups are bonded. It has been found, for example, that the formation of polyamide or polyimide systems achieves, in addition to abrasion resistance, also a particularly high thermal stability up to 300° C.

Depending on the particle size of the added particles, the properties can be modified within various ranges. When particles in the μm, range are utilized and the refractive index of the matrix is not adjusted to the particles, opaque to translucent layers are achieved. However, the selection of the starting components, especially of the epoxides and of the fraction of aromatic (highly refractive) components and aliphatic components allows the refractive index to be adjusted to various powders used with mean particle diameters in the μm, range. The refractive index of the powder plays a role here, for which there is a relatively wide selection, starting with $SiO_2$ with very low refractive indices through aluminum oxide, silicon carbide and zirconium dioxide with higher refractive indices.

To achieve transparent layers, it is also possible to use particles which are adjusted to the refractive index of the matrix and which are obtainable, for example, via mixed oxides. Such a refractive index adjustment allows light scattering to be prevented and the layers remain transparent. An increased transparency can also be achieved by a reduced particle size, for example by use of powder in the sub-μm, or nm range, since light scattering here automatically becomes lower according to the Rayleigh formula and transparency is increased. The possibility thus exists of achieving opaque or nontransparent up to transparent coatings.

The incorporation of the perfluorinated monomers and oligomers by the abovementioned principles then makes it possible to hydrophobize and to oleophobize the entire matrix, so that, in addition to a very high abrasion resistance, the positive properties are not impaired even after abrasional stress (any surface can be abraded to a slight degree after prolonged stress). For example, in abrasion tests with a Taber abrasion machine, even after 1000 cycles, no changes whatsoever in the contact angle to water (for example 90 to 100° C.) and in the contact angle to hexadecane (for example 60 to 70° C.) detected.

It is evident from this that the fluorinated components are distributed uniformly in the layer or in the shaped body and essentially do not form any concentration gradients or a linear gradient in the vertical direction, while the problem frequently occurs in the conventional layers that the fluorine components are enriched or concentrated at the surface.

In combination with the refractive index adjustment, this enables highly transparent systems with high abrasion and alkali resistance. Thus, inventive layers or shaped bodies can be obtained which are extremely abrasion-resistant, for systems investigated, for example with the Taber Abrader CFIO abrasion machine after 1000 cycles, a value of less than 5 mg of attritus is obtained.

The layers and shaped bodies are usable for a large number of applications. As explained, the composition is suitable as a coating composition for virtually all substrates, so that virtually all objects can be coated.

It has also been found that abrasion-resistant and oleophobic layers or shaped bodies which are additionally exceptionally alkali-resistant can be obtained in accordance with the invention. Inventive coatings were exposed to a medium with a pH of 12 at 65° C. for 3 hours. In the course of this, the layers remained stable; none of the layers investigated was attacked.

There is also no restriction with regard to the equipment which can be coated fully or partly with the inventive composition or be formed in the form of a shaped body. For example, the composition is suitable for objects in the vehicle sector, for example automobiles, ships, aircraft, in engine construction, in the household, in mechanical engineering, in the chemicals industry, the foods industry, the food processing industry, process technology, especially microelectronics, in nanotechnology, in the hygiene sector, such as in the bathroom sector, in hotels and in the medical sector, especially for hospitals. The coatings and shaped bodies are suitable especially for keeping equipment or built structures of all types clean.

Examples of treatment objects or treatable parts of objects are beds, instruments, vessels, especially in hospitals, household equipment, kitchen fittings, bathroom fittings such as bathtubs, tiles, shower cubicles, washbasins, toilets, fittings, exteriors of machines and other objects, mechanically stressed parts, for example transport systems, tubes, mechanical processing systems, kneaders, mills, mixers, food packaging, roof tiles, windows, facades, containers of all types for dry and liquid goods, aqueous systems and nonaqueous systems and silos, wind rotors or turbines.

In addition, by virtue of incorporation of microbicidal, pigment-like components or microbicidally active metal particles, microbicidal properties can be achieved.

There follow examples to illustrate the invention.

EXAMPLE

Example 1

1-Component System

The substrate used was aluminum (100×100 mm AlMg3). The substrate was provided with a primer (4.23 g of LM 910 (Asahi), 0.96 g of Desmodur N 3300 (Bayer) and 4.00 g of toluene). The primer was applied by knife-coating and dried at from 50 to 60° C. for 5 min.

Subsequently, a composition according to the invention was applied and cured. The functional layers obtained were evaluated with the aid of a Taber abrasion machine and the measurement of the contact angles.

| | |
|---|---|
| Fluorolink C (Solvay): | 4.28 g |
| Polyol (Desmophen 670, Bayer): | 10.16 g |
| Toluene: | 5 g |
| Desmodur BL 3175 SN (Bayer): | 15.87 g |
| SiC UF-10 (H. C. Starck): | 11.29 g |

The above composition was dispersed at 1500 rpm with from 10 to 15 g of glass beads for 90 min and was storage-stable. The composition was applied to the above-described substrate by knife-coating and cured at 160° C. for from 60 to 120 min.

| | |
|---|---|
| Attritus after 500 cycles: | 3.4 mg |
| Contact angle: | |
| with respect to water: | 110° at untreated sites |
| | 125° at treated sites (abrasion machine) |
| with respect to hexadecane: | 70° at untreated sites |
| | 70° at treated sites (abrasion machine) |

Example 2

2-Component System

| | |
|---|---|
| Fluorolink C (Solvay): | 1.54 g |
| LM 910 (Asahi): | 15.64 g |
| Xylene: | 3 g |
| SiC UF-10 (H. C. Starck): | 6.82 g |

The above composition was dispersed at 1500 rpm with from 10 to 15 g of glass beads for 90 min and was storage-stable. 4.05 g of Desmodur N 3300 (Bayer) were then added: after addition of Desmodur, the system must be applied. The composition was applied by knife-coating to the substrate of example 1 and cured at 160° C. for from 60 to 120 min. Curing is also possible at lower temperature.

| | |
|---|---|
| Attritus after 500 cycles: | 4 mg |
| Contact angle: | |
| with respect to water: | 110° at untreated sites |
| | 115° at treated sites (abrasion machine) |
| with respect to hexadecane: | 65° at untreated sites |
| | 50° at treated sites (abrasion machine) |

Example 3

Epoxide System (2-Component System)

| | |
|---|---|
| Epoxide L20: | 20 g in 4 g of IPE |
| Fluorolink C (Solvay): | 2.28 g |
| SiC UF-10 (H. C. Starck): | 10.7 g |

The above composition was dispersed at 1500 rpm with from 10 to 15 g of glass beads for 90 min and was storage-stable. 5 g of VE3261 crosslinker were then added. After addition of crosslinker, the system must be applied. The composition was applied by knife-coating to the substrate of example 1 and cured at 130° C. for from 60 to 120 min. Curing is also possible at lower temperature.

| | |
|---|---|
| Attritus after 1000 cycles: | 1.5 mg |
| Contact angle: | |
| with respect to water: | 108° at untreated sites |
| | 110° at treated sites (abrasion machine) |
| with respect to hexadecane: | 65° at untreated sites |
| | 40° at treated sites (abrasion machine) |

Example 4

Epoxide System (2-Component System)

| | |
|---|---|
| Epoxide L20: | 20 g in 4 g of IPE |
| Fluorolink D10H (Solvay): | 4.16 g |
| SIC UF-10 (H. C. Starck): | 12.5 g |

The above composition was dispersed at 1500 rpm with from 10 to 15 g of glass beads for 90 min and was storage-stable. 5 g of VE3261 crosslinker were then added. After addition of crosslinker, the system must be applied. The composition was applied by knife-coating to a substrate and cured at 130° C. for from 60 to 120 min. Curing is also possible at lower temperature.

| | |
|---|---|
| Attritus after 1000 cycles: | 0.5 to 1 mg |
| Contact angle: | |
| with respect to water: | 110° at untreated sites |
| | 100° at treated sites (abrasion machine) |
| with respect to hexadecane: | 75° at untreated sites |
| | 60-65° at treated sites (abrasion machine) |

Example 5

Epoxide System (2-Component System)

| | |
|---|---|
| Epoxide L20: | 20 g in 4 g of IPE |
| Fluorolink D10H (Solvay): | 4.16 g |
| SKIRON SF 300: | 19.44 g |

The above composition was dispersed at 1500 rpm with from 10 to 15 g of glass beads for 90 min and was storage-stable. 5 g of VE3261 crosslinker were then added. After addition of crosslinker, the system must be applied. The composition was applied by knife-coating to a substrate and cured at 130° C. for from 60 to 120 min. Curing is also possible at lower temperature.

| | |
|---|---|
| Attritus after 1000 cycles: | 7 to 9 mg |
| Contact angle: | |
| with respect to water: | 95° at untreated sites |
| | 105° at treated sites (abrasion machine) |
| with respect to hexadecane: | 70° at untreated sites |
| | 60° at treated sites (abrasion machine) |

Example 6

Epoxide System (2-Component System)

| | |
|---|---|
| Epoxide L20: | 20 g in 4 g of IPE |
| Fluorolink D10H (Solvay): | 4.16 g |
| SILBOND 600EST: | 19.44 g |

The above composition was dispersed at 1500 rpm with from 10 to 15 g of glass beads for 90 min and was storage-stable. 5 g of VE3261 crosslinker were then added. After addition of crosslinker, the system must be applied. The composition was applied by knife-coating to a substrate and cured at 130° C. for from 60 to 120 min. Curing is also possible at lower temperature.

| | |
|---|---|
| Attritus after 1000 cycles: | 4 to 6 mg |
| Contact angle: | |
| with respect to water: | 100° at untreated sites |
| | 100° at treated sites (abrasion machine) |
| with respect to hexadecane: | 70° at untreated sites |
| | 65° at treated sites (abrasion machine) |

Example 7

Epoxide System (2-Component System)

| | |
|---|---|
| Epoxide L20: | 20 g in 4 g of IPE |
| Fluorolink D10H (Solvay): | 4.16 g |
| SILBOND 100EST: | 19.44 g |

The above composition was dispersed at 1500 rpm with from 10 to 15 g of glass beads for 90 min and was storage-stable. 5 g of VE3261 crosslinker were then added. After addition of crosslinker, the system must be applied. The composition was applied by knife-coating to a substrate and cured at 130° C. for from 60 to 120 min. Curing is also possible at lower temperature.

| | |
|---|---|
| Attritus after 1000 cycles: | 2 to 3 mg |
| Contact angle: | |
| with respect to water: | 95° at untreated sites |
| | 110° at treated sites (abrasion machine) |
| with respect to hexadecane: | 65° at untreated sites |
| | 65° at treated sites (abrasion machine) |

Example 8

Epoxide System (2-Component System)

| | |
|---|---|
| Epoxide L20: | 20 g in 4 g of IPE |
| Fluorolink D10H (Solvay): | 4.16 g |
| SILBOND 100EST: | 19.44 g |
| Graphite: | 4.86 g |

The above composition was dispersed at 1500 rpm with from 10 to 15 g of glass beads for 90 min and was storage-stable. 5 g of VE3261 crosslinker were then added. After addition of crosslinker, the system must be applied. The composition was applied by knife-coating to a substrate and cured at 130° C. for from 60 to 120 min. Curing is also possible at lower temperature.

| Attritus after 1000 cycles: | 3 to 4 mg |
|---|---|
| Contact angle: | |
| with respect to water: | 100° at untreated sites |
| | 100° at treated sites (abrasion machine) |
| with respect to hexadecane: | 68° at untreated sites |
| | 60° at treated sites (abrasion machine) |

Example 9

High-Temperature-Resistant Oleophobic and Hydrophobic Layer 32.87 g (0.076 mol) of 4,4'-bis(3-aminophenoxydiphenyl sulfone) were dissolved in 200 g of methyl-2-pyrrolidone (NMP) at RT. The mixture was then admixed first with 5.6 (0.008 mol) of Fluorolink® D10H and then with 25.78 g (0.08 mol) of 4,4'-benzophenonetetracarboxylic dianhydride. The whole mixture was stirred overnight at RT. In this mixture, 42.77 g of SiC UF-10 (H. C. Starck) were dispersed with from 10 to 15 g of glass beads at 1500 rpm for 90 min.

This system was used to coat 10×10 cm aluminum plates by spin-coating at 500 rpm. The coated aluminum plates, after storage at room temperature for 10 minutes, were cured at 200° C. for 120 minutes. The resulting layer thickness was from 10 to 15 μm.

In the course of testing of the adhesion properties, there was no flaking-off of the coatings (Gt0/Gtt0) in the crosscut/tape test. The examination of the abrasion resistance of the coated Al plates with the Taber abrasion test (roller material: CS10 F, 1000 cycles, 500 g roller load) gave 4 mg of weight loss.

| Contact angle: | |
|---|---|
| with respect to water: | 105° at untreated sites |
| | 90° at treated sites (abrasion machine) |
| with respect to hexadecane: | 65° at untreated sites |
| | 60° at treated sites (abrasion machine) |

Example 10

High-Temperature-Resistant Oleophobic and Hydrophobic Layer 32.87 g (0.076 mol) of 4,4'-bis(3-aminophenoxy)diphenyl sulfone were dissolved in 200 g of methyl-2-pyrrolidone (NMP) at RT. The mixture was then admixed first with 5.6 (0.008 mol) of Fluorolink® D10H and then with 25.78 g (0.08 mol) of 4,4'-benzophenonetetracarboxylic dianhydride. The whole mixture was stirred overnight at RT. In this mixture, 42.77 g of Amperit (5 to 15 μm) (H. C. Starck) were dispersed with from 10 to 15 g of glass beads at 1500 rpm for 90 min.

This system was used to coat 10×10 cm aluminum plates by spin-coating at 500 rpm. The coated aluminum plates, after storage at room temperature for 10 minutes, were cured at 200° C. for 120 minutes. The resulting layer thicknesses were from 10 to 15 μm.

In the course of testing of the adhesion properties, there was no flaking-off of the coatings (Gt0/Gtt0) in the crosscut/tape test. The examination of the abrasion resistance of the coated Al plates with the Taber abrasion test (roller material: CS10F, 1000 cycles, 500 g roller load) gave 5 to 6 g of weight loss.

| Contact angle: | |
|---|---|
| with respect to water: | 105° at untreated sites |
| | 90° at treated sites (abrasion machine) |
| with respect to hexadecane: | 58° at untreated sites |
| | 60° at treated sites (abrasion machine) |

Example 11

High-Temperature-Resistant Oleophobic and Hydrophobic Layer 31.14 g (0.072 mol) of 4,4'-bis(3-aminophenoxy)diphenyl sulfone were dissolved in 200 g of 2-methylpyrrolidone (NMP) at RT. The mixture was then admixed first with 11.2 g (0.016 mol) of Fluorolink® D10H and then with 25.78 g (0.08 mol) of 4,4'-benzophenonetetracarboxylic dianhydride. The whole mixture was stirred overnight at RT. In this mixture, 45.41 g of SiC UF-10 (H. C. Starck) were dispersed with from 10 to 15 g of glass beads at 1500 rpm for 90 min.

This system was used to coat 10×10 cm aluminum plates by spin-coating at 500 rpm. The coated aluminum plates, after storage at room temperature for 10 minutes, were cured at 200° C. for 120 minutes. The resulting layer thicknesses were from 10 to 15 μm.

In the course of testing of the adhesion properties, there was no flaking-off of the coatings (Gt0/Gtt0) in the crosscut/tape test. The examination of the abrasion resistance of the coated Al plates with the Taber abrasion test (roller material: CS10 F, 1000 cycles, 500 g roller load) gave 1.5 mg of weight loss.

| Contact angle: | |
|---|---|
| with respect to water: | 108° at untreated sites |
| | 90° at treated sites (abrasion machine) |
| with respect to hexadecane: | 65° at untreated sites |
| | 60° at treated sites (abrasion machine) |

Example 12

High-Temperature-Resistant Oleophobic and Hydrophobic Layer 31.14 g (0.072 mol) of 4,4'-bis(3-aminophenoxy)diphenyl sulfone were dissolved in 200 g of 2-methylpyrrolidone (NMP) at RT. The mixture was then admixed first with 11.2 g (0.016 mol) of Fluorolink® D10H and then with 25.78 g (0.08 mol) of 4,4'-benzophenonetetracarboxylic dianhydride.

The whole mixture was stirred overnight at RT. In this mixture, 45.41 g of Amperit (H. C. Starck) were dispersed with from 10 to 15 g of glass beads at 1500 rpm for 90 min.

This system was used to coat 10×10 cm aluminum plates by spin-coating at 500 rpm. The coated aluminum plates, after storage at room temperature for 10 minutes, were cured at 200° C. for 120 minutes. The resulting layer thicknesses were from 10 to 15 μm.

In the course of testing of the adhesion properties, there was no flaking-off of the coatings (Gt0/Gtt0) in the crosscut/tape test. The examination of the abrasion resistance of the coated Al plates with the Taber abrasion test (roller material: CS10 F, 1000 cycles, 500 g roller load) gave 3 mg of weight loss.

| Contact angle: | |
|---|---|
| with respect to water: | 95° at untreated sites |
| | 90° at treated sites (abrasion machine) |
| with respect to hexadecane: | 59° at untreated sites |
| | 60° at treated sites (abrasion machine) |

Example 13

High-Temperature-Resistant Oleophobic and Hydrophobic Layer 31.14 g (0.072 mol) of 4,4'-bis(3-aminophenoxy)diphenyl sulforie were dissolved in 200 g of 2-methylpyrrolidone (NMP) at RT. The mixture was then admixed first with 11.2 g (0.016 mol) of Fluorolink® D10H and then with 17.45 g (0.08 mol) of pyromellitic dianhydride. The whole mixture was stirred overnight at RT. In this mixture, 45.41 g of SiC UF-10 (H. C. Starck) were dispersed with from 10 to 15 g of glass beads at 1500 rpm for 90 min.

This system was used to coat 10×10 cm aluminum plates by spin-coating at 500 rpm. The coated aluminum plates, after storage at room temperature for 10 minutes, were cured at 200° C. for 120 minutes. The resulting layer thicknesses were from 10 to 15 μm.

In the course of testing of the adhesion properties, there was no flaking-off of the coatings (Gt0/Gtt0) in the crosscut/tape test. The examination of the abrasion resistance of the coated Al plates with the Taber abrasion test (roller material: CS10 F, 1000 cycles, 500 g roller load) gave 2.0 mg of weight loss.

| Contact angle: | |
|---|---|
| with respect to water: | 107° at untreated sites |
| | 90° at treated sites (abrasion machine) |
| with respect to hexadecane: | 63° at untreated sites |
| | 60° at treated sites (abrasion machine) |

Example 14

High-Temperature-Resistant Oleophobic and Hydrophobic Layer 31.14 g (0.072 mol) of 4,4'-bis(3-aminophenoxy)diphenyl sulfone were dissolved in 200 g of 2-methylpyrrolidone (NMP) at RT. The mixture was then admixed first with 11.2 g (0.016 mol) of Fluorolink® D10H and then with 17.45 g (0.08 mol) of pyromellitic dianhydride. The whole mixture was stirred overnight at RT. In this mixture, 45.41 g of Amperit (H. C. Starck) were dispersed with from 10 to 15 g of glass beads at 1500 rpm for 90 min.

This system was used to coat 10×10 cm aluminum plates by spin-coating at 500 rpm. The coated aluminum plates, after storage at room temperature for 10 minutes, were cured at 200° C. for 120 minutes. The resulting layer thicknesses were from 10 to 15 μm.

In the course of testing of the adhesion properties, there was no flaking-off of the coatings (Gt0/Gtt0) in the crosscut/tape test. The examination of the abrasion resistance of the coated Al plates with the Taber abrasion test (roller material: CS10 F, 1000 cycles, 500 g roller load) gave 2.5 mg of weight loss.

| Contact angle: | |
|---|---|
| with respect to water: | 95° at untreated sites |
| | 92° at treated sites (abrasion machine) |
| with respect to hexadecane: | 62° at untreated sites |
| | 60° at treated sites (abrasion machine) |

The coated plates which were obtained in examples 8 to 14 were subjected to a temperature of 300° C. for 45 min. The contact angle with respect to water and hexadecane remained unchanged.

All layers obtained according to examples 1 to 14 were also tested for alkali resistance. For this purpose, the coatings were exposed to a medium with a pH of 12 at a temperature of 65° C. for 3 h. The layers remained stable. No attack on the layers examined was observed. Coatings which had been produced with Fluorolink D10H exhibited a better alkali resistance than the layers produced with Fluorolink C. Moreover, the layers produced with 4,4'-benzophenonetetracarboxylic dianhydride were more alkali-stable than the layers produced with pyromellitic dianhydride.

What is claimed is:

1. A composition for the production of an abrasion-resistant and alkali-resistant coating or shaped body, wherein the composition comprises
(a) a curable binder system comprising at least one organic polymer or oligomer with one or more functional groups, or a precursor thereof, and further comprising a crosslinking agent and/or hardener, which crosslinking agent and/or hardener comprises one or more of a di- or tetracarboxylic acid, an anhydride thereof or another derivative thereof as a carboxylic acid component, and at least one of a diamine and a tetramine as an amine component, at least one of the carboxylic acid component and the amine component comprising an aromatic radical,
(b) at least one fluorinated polymer or oligomer having at least one functional group which is capable of undergoing a chemical reaction with a functional group of the binder system, and
(c) one or more types of inorganic particles having a mean particle diameter of from 1 μm to 100 μm and comprising at least one abrasive material selected from diamond, granite, pumice, tripel, silicon carbide, emery, alumina, silica, gypsum, boron carbide.

2. The composition of claim 1, wherein the at least one functional group of (b) comprises one or more of a —SO$_3$H group, a —PO$_3$H group, an amino group, a carboxyl group and a hydroxyl group.

3. The composition of claim 1, wherein the at least one fluorinated polymer or oligomer of (b) comprises at least one of a fluorinated polyether and a fluoroethylene-alkyl vinyl ether copolymer.

4. The composition of claim 1, wherein (c) is present in an amount of from 5% to 60% by weight, based on a total weight of (a), (b) and (c).

5. The composition of claim 1, wherein (c) comprises at least silicon carbide.

6. The composition of claim 1, wherein (c) comprises at least boron carbide.

7. The composition of claim 1, wherein (c) comprises at least silica.

8. The composition of claim 1, wherein (c) comprises at least alumina.

9. The composition of claim 1, wherein (c) comprises surface-modified particles.

10. The composition of claim 9, wherein (c) comprises particles which are modified with one or more groups which comprise an epoxy group or an amine group.

11. The composition of claim 1, wherein (c) comprises particles having a mean particle diameter of from 1 µm to 50 µm.

12. The composition of claim 1, wherein (a) comprises at least one of an epoxy resin, a polyol, a polyisocyanate, a polyester, a polyacrylate, a polyamine, a polyamide, a polyimide, a polybenzimidazole and precursors thereof.

13. The composition of claim 1, wherein (a) comprises components which give rise to a polyurethane resin.

14. The composition of claim 1, wherein the composition further comprises at least one of a solvent and an additive.

15. A process for producing a substrate having an abrasion-resistant and alkali-resistant coating, wherein the process comprises applying to the substrate the composition of claim 1 and curing the applied composition.

16. A substrate having an abrasion-resistant and alkali-resistant coating, wherein the coating comprises a cured composition of claim 1.

17. The substrate of claim 16, wherein fluorinated components are uniformly distributed throughout the coating.

18. The substrate of claim 16, wherein the coating exhibits an abrasion value, measured after 1,000 cycles on a Taber abrasion apparatus, of less than 5 mg.

19. The substrate of claim 16, wherein the coating exhibits a contact angle with respect to water, measured on a smooth surface, of at least 80° and a contact angle with respect to hexadecane, measured on a smooth surface, of at least 45°.

20. The substrate of claim 16, wherein the coating remains stable after exposure to a medium of pH 12 for 3 hours at 65° C.

21. A process for producing an abrasion-resistant and alkali-resistant shaped body, wherein the process comprises shaping the composition of claim 1 and curing the shaped composition.

22. An abrasion-resistant and alkali-resistant shaped body, wherein the shaped body comprises a cured composition of claim 1.

23. A method of keeping an object or built structure clean, wherein the method comprises providing the object or built structure with a coating which comprises a cured composition of claim 1 or producing the object or built structure from the composition of claim 1.

24. The composition of claim 1, wherein the at least one fluorinated polymer or oligomer of (b) comprises an oligomer having a weight average molecular weight of from 500 to 3000.

25. The composition of claim 1, wherein (a) comprises a first functional group and a second functional group that is reactive with the first functional group and (b) comprises a third functional group that is reactive with the first functional group and wherein a molar ratio of first functional group to second functional group plus third functional group is about 1:1.

26. A substrate having an abrasion-resistant and alkali-resistant coating, wherein the coating comprises a cured composition of claim 1 in which fluorinated components do not exhibit a concentration gradient in vertical direction.

27. An abrasion-resistant and alkali-resistant shaped body, wherein the body comprises a cured composition of claim 1 in which fluorinated components do not exhibit a concentration gradient in vertical direction.

28. The substrate of claim 26, wherein the coating exhibits an abrasion value, measured after 1,000 cycles on a Taber abrasion apparatus, of less than 5 mg.

29. The substrate of claim 28, wherein the coating exhibits a contact angle with respect to water, measured on a smooth surface, of at least 80° and a contact angle with respect to hexadecane, measured on a smooth surface, of at least 45°.

30. The substrate of claim 29, wherein the coating remains stable after exposure to a medium of pH 12 for 3 hours at 65° C.

31. A composition for the production of an abrasion-resistant and alkali-resistant coating or shaped body, wherein the composition comprises
    (a) a curable binder system comprising one or more of an epoxy resin, a polyol, a polyisocyanate, a polyester, a polyacrylate, a polyamine, a polyamide, a polyimide, a polybenzimidazole and precursors thereof, and further comprising a crosslinking agent and/or hardener, which crosslinking agent and/or hardener comprises one or more of a di- or tetracarboxylic acid, an anhydride thereof or another derivative thereof as a carboxylic acid component, and at least one of a diamine and a tetramine as an amine component, at least one of the carboxylic acid component and the amine component comprising an aromatic radical,
    (b) at least one fluorinated polymer or oligomer having at least one functional group which is capable of undergoing a chemical reaction with a functional group of the binder system and comprises one or more of a —SO$_3$H group, a —PO$_3$H group, an amino group, a carboxyl group and a hydroxyl group, and
    (c) one or more types of inorganic particles having a mean particle diameter of from 1 µm to 50 µm and comprising at least one abrasive material selected from diamond, granite, pumice, tripel, silicon carbide, emery, alumina, silica, gypsum, boron carbide.

32. The composition of claim 31, wherein (c) is present in an amount of from 5% to 60% by weight, based on a total weight of (a), (b) and (c).

33. The composition of claim 31, wherein (b) comprises at least one of a fluorinated polyether and a fluoroethylene-alkyl vinyl ether copolymer.

34. The composition of claim 31, wherein (c) comprises surface-modified particles.

35. The composition of claim 34, wherein (c) comprises particles which are modified with one or more groups which comprise an epoxy group or an amine group.

36. The composition of claim 31, wherein the at least one fluorinated polymer or oligomer of (b) comprises an oligomer having a weight average molecular weight of from 600 to 1500.

* * * * *